March 17, 1931. A. M. TROGNER 1,796,637
POTENTIAL INDICATING DEVICE FOR SIGNALING SYSTEMS
Filed March 26, 1929 2 Sheets-Sheet 2
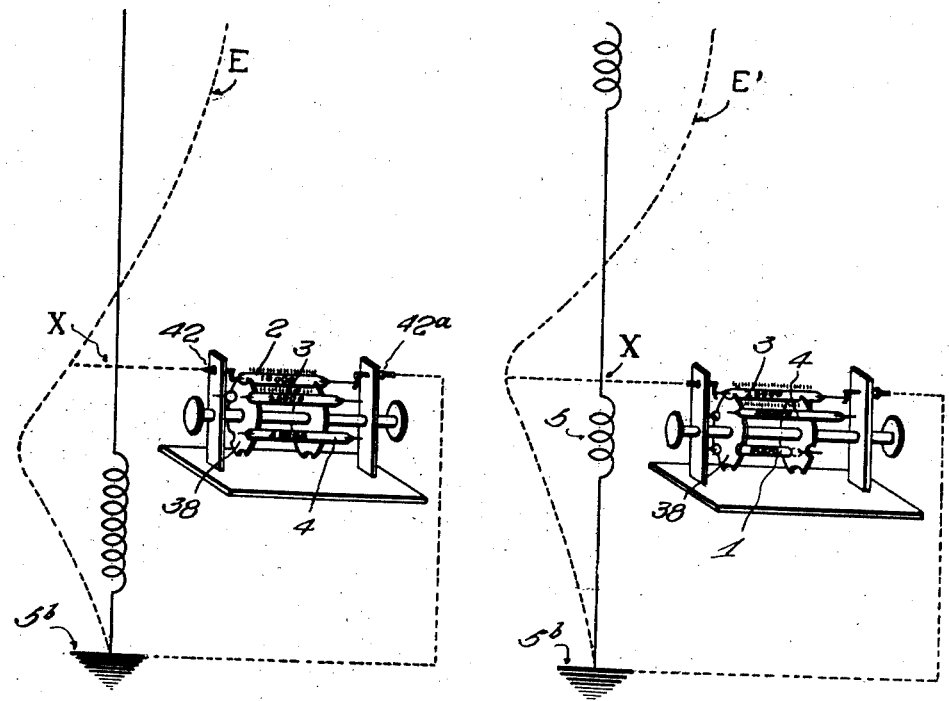
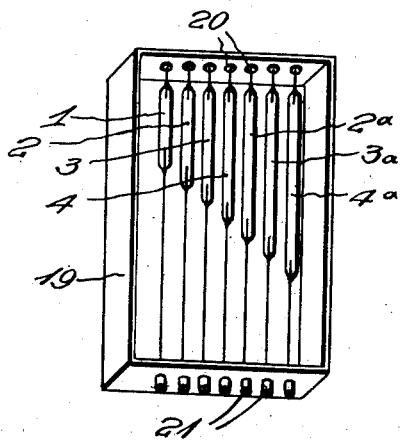
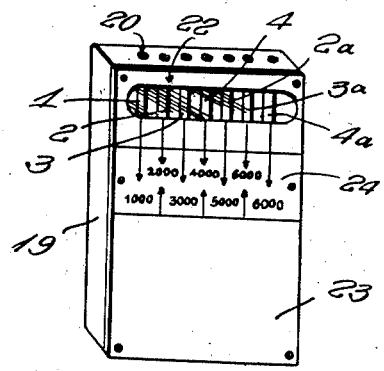
INVENTOR.
Arthur M. Trogner,
BY Harold Todd
ATTORNEY.

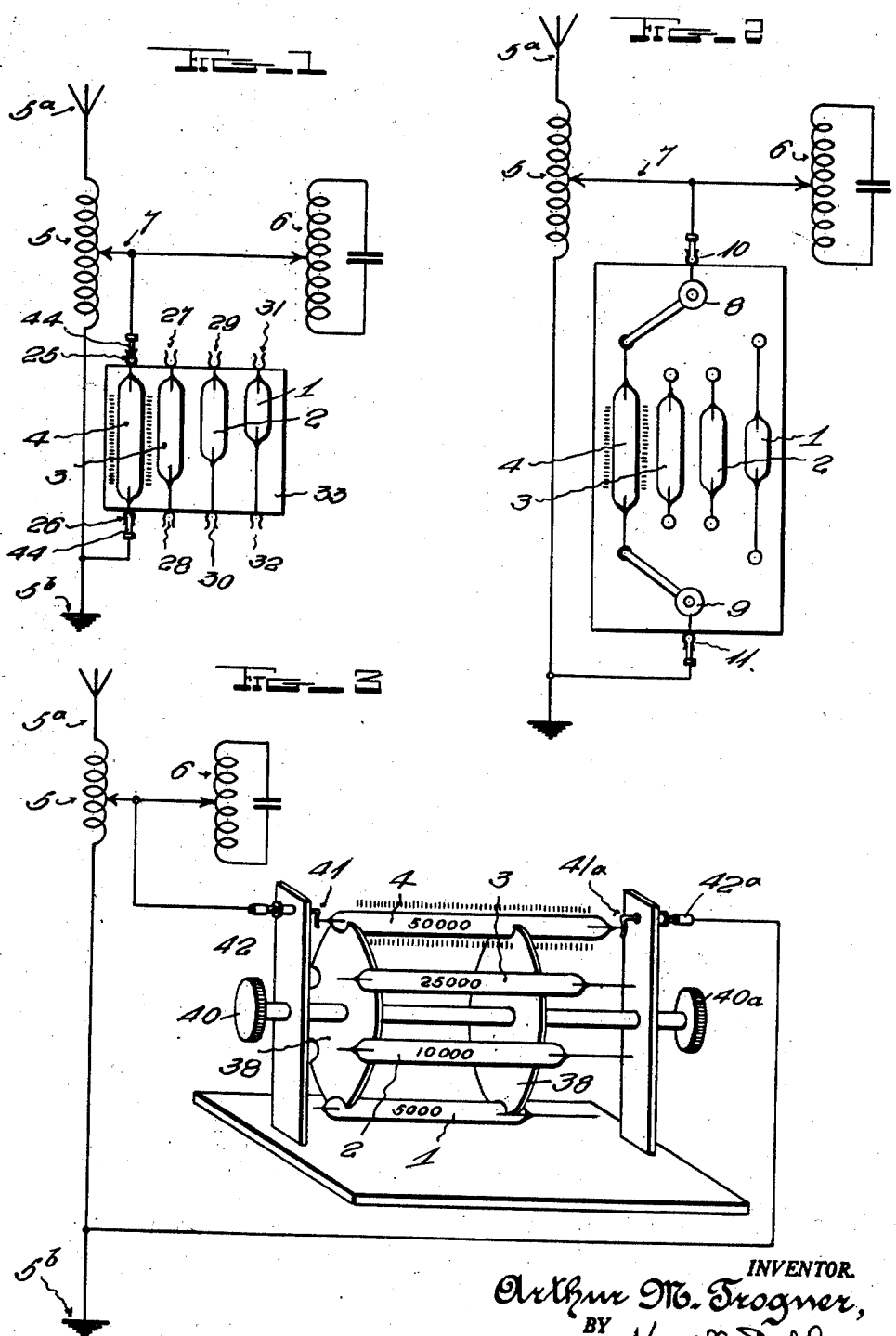

Patented Mar. 17, 1931

1,796,637

UNITED STATES PATENT OFFICE

ARTHUR M. TROGNER, OF EAST ORANGE, NEW JERSEY, ASSIGNOR, BY MESNE ASSIGNMENTS, TO FEDERAL TELEGRAPH COMPANY, A CORPORATION OF CALIFORNIA

POTENTIAL-INDICATING DEVICE FOR SIGNALING SYSTEMS

Application filed March 26, 1929. Serial No. 350,095.

My invention relates to voltage indicating devices employed in signaling systems.

An object of my invention is to indicate the electromotive force distribution in signaling systems.

Another object of my invention is to indicate relative values of potential differences in a given portion of a signaling system.

Still another object of my invention is to obtain measurements of potential differences in a given portion of a high frequency signaling system without changing its characteristics.

Other and further objects of my invention reside in the electrical characteristics of the potential indicating device and the provision for the determination of relative values of potential without changing the position of the indicating device in respect to the circuit measured. A better understanding of the potential indicating device of my invention can be had by referring to the specification following and to the accompanying drawings, wherein: Figures 1, 2 and 3 are schematic diagrams showing the potential indicating device of my invention, Figs. 4 and 5 are schematic diagrams showing the operation of the potential indicating device of my invention and Figs. 6 and 7 show the structural features of one form of the potential indicating device of my invention.

In electrical systems in general and more particularly in high frequency electrical systems it is frequently desirable if not necessary to determine the potential in different circuits or in various parts of a circuit. When extremely high potentials are employed the meters of the type generally employed in low potential circuits are unsuitable. A suitable indicating instrument similar to the movable vane, movable coil or other type of galvanometer would be of enormous dimensions. An indicating device capable of indicating high potential energy is the glow discharge tube. The glow discharge tube usually consists of a glass, quartz or silicate composition envelope enclosing two electrodes. The envelope is evacuated of air and filled with an inert gas such as neon, argon or krypton. The two electrodes are spacially positioned in the envelope and associated with the source of potential to be measured. The gas is ionized by the energy from such a source and causes a luminous radiation the color of which depends upon the gas content. The length of separation between the electrodes largely determines the potential necessary to produce ionization. Excitation from a potential in excess of that necessary to produce ionization of the gas causes a gradual diminishing in sensitivity and luminous radiation. The potential band to which response may be had is limited to the particular characteristics of the tube employed. Thus the tube will indicate a potential of 1000 volts for instance and will likewise indicate a potential of 2000 volts. If the particular tube employed is of the proper design to indicate a potential of 2000 volts the tube will likewise indicate a potential of 4000 volts. The potentials in excess of the potential necessary to produce ionization cause a gradual diminishing of the glow discharge and the characteristics of the tube change in such a manner that the former potential necessary to produce ionization is no longer the critical potential. Likewise the glow discharge tube responsive to potentials of the order of 5000 are seldom responsive to potentials of the order of 100. The foregoing disadvantages and inefficient operational characteristics are overcome in the potential indicating device of my invention, a better understanding of which can be had by referring to the accompanying drawings.

Figure 1 shows a schematic diagram of the potential indicating device of my invention employed in combination with a space radio radiating system. The space radio radiating system includes inductance 5, antenna 5a and ground 5b. A source of high potential high frequency energy 6 is associated with inductance 5 by means of contact member 7. The potential indicating device of my invention includes glow discharge tubes 1, 2, 3 and 4 connected to jacks 25, 26, 27, 28, 29, 30, 31 and 32, and the whole mounted on a base 33. Plugs 44 having attached connecting wires are connected with inductance 5, contact member 7 and ground 5b. The operation of the glow discharge tubes 1, 2, 3 and 4 depends upon the value of potential between contact 7 and ground 5b. Should the potential difference be of a low order between these two points and plugs 44 connected to jacks 31, 32 glow discharge tube 1 would be energized. An increase of potential between contact member 7 and ground 5b would be sufficient to energize tubes 2, 3 and 4 in like manner in the order named proportional to increasing values of potential required to produce ionization of the inert gas contained therein. As a concrete example, suppose that glow discharge tube 3 has a critical ionizing potential and it is necessary to impress a potential of the order of 5000 volts across its two electrodes to start the glow discharge. Tube 4 would have a correspondingly higher critical potential break down. A potential difference of 5000 volts across the electrodes of glow discharge tubes 1 and 2 would be excessive. Glow discharge tube 3 would respond since this potential is sufficient to start ionization and cause a noticeable glow discharge. Tube 2 would have a much lower critical potential break down value and it would likewise respond. Tube 1 has a correspondingly lower critical potential break down value and it would likewise respond. The tube having the higher break down potential or higher potential required to produce ionization would therefore, if giving off luminous radiation, indicate that the value of potential difference lies between this critical break down potential and the potential value necessary to cause ionization of the next larger tube which in this instance is tube 4 and which is not ionized by the impressed potential.

Fig. 2 of the accompanying drawings shows a modification of the potential indicating device of my invention. Corresponding reference characters are employed throughout all the drawings. In this modification switch members 8 and 9, having associated jacks 10 and 11, are employed in combination with glow discharge tubes 1, 2, 3 and 4. Switch members 8 and 9 are adapted to selectively associate the energy with the several tubes whereby lowest value required to produce ionization corresponds to the potential of the energy associated with jacks 10 and 11. Switch members 8 and 9 may be calibrated whereby the potential of the energy through glow discharge tubes 1, 2, 3 and 4 required to give sufficient glow discharge, may be ascertained without reading the calibrated rating on the tube itself. A much higher voltage than is necessary to produce ionization causes damage to the tubes and may destroy the critical potential calibration. It is therefore advisable to begin the measurement with tube 4 so as to limit the value of current and protect the lower calibrated tubes from overload. This is especially desirable in connection with the tubes requiring a lower potential to produce ionization. Fig. 3 shows another modification of the potential indicating device of my invention. In this arrangement glow discharge tubes 1, 2, 3 and 4 are adapted to be selectively associated with source 6 and space radio radiating system 5, 5a, 5b.

Tubes 1, 2, 3 and 4 are supported on a rotatable framework 38 adapted to be rotated by knobs 40, 40a whereby the terminals of the respective tubes are associated with contact members 41, 41a. Contact members 41 and 41a are electrically connected to jacks 42 and 42a. Jacks 42 and 42a are in turn connected to the source of high potential energy. Since tubes 1, 2, 3 and 4 are mounted in this manner, the disturbance of the voltage distribution in the system is small. Any of the tubes may be readily connected to or disconnected from the source of energy by rotating the member 38. With the critical striking potential calibrated on each of the several tubes it is not difficult to accurately and quickly determine the value of potential.

Figs. 4 and 5 are schematic diagrams showing the operation of the potential indicating device of my invention. The reference characters correspond to those of Figs. 1, 2 and 3. Glow discharge tubes 1, 2, 3 and 4 are adapted to be selectively associated with radiating circuit 5 at any point, say X, and associated with ground 5b by means of conductive or capacitive coupling. In Fig. 4 the potential distribution is represented by the dotted line E. The antinode or potential loop is not at the position X. The gas in glow discharge tube 2 may be ionized at the value of potential difference between X and ground 5b. The position of the rotatable framework is such as to connect this tube in the circuit. The potential may not be however, of sufficient value to energize tube 3.

Fig. 5 shows a different distribution of potential represented by E'. In this particular case the antinode or potential loop is at the point X which would cause a higher potential to energize the tubes 1, 2, 3 and 4. The gas in glow discharge tube 3 may be ionized at this value of potential difference between X and ground 5b, however not of sufficient value to energize tube 4. The potential indicating device remaining in the same position the potential distribution may easily be determined. The largest glow discharge tube illuminated would indicate the maximum potential or antinode. With a fair knowledge of the characteristics of the circuit 5, 5b, the position of the antinode could be readily determined by observing the largest tube which is ionized, knowing the maximum value of potential and reading the calibration from the ionized tube.

Figs. 6 and 7 show certain structural features of one form of the potential indicating device of my invention. Glow discharge tubes 1, 2, 3, 4, 2a, 3a and 4a are connected to connecting jacks at each end of container 19. Container 19 may be of metal or other material and provided with individual compartments for each of the glow discharge tubes. Individual connecting jacks 20 are connected to the electrodes of each tube nearest these jacks while jacks 21 mounted in the opposite end of container 19 are connected to the remaining terminals of each of the respective tubes. In the illustration Fig. 6, the cover is removed from container 19. Felt or suitable metal shielding may be inserted between each of the glow discharge tubes 1, 2, 3, 4, 2a, 3a and 4a.

Fig. 7 shows the potential indicating device of my invention with the cover or panel 23 placed on the container 19. A window 22 is provided in panel 23 whereby the ionization effect is visible and a scale 24 is adjacent thereto on which the potential break down or critical ionization potential of each tube is calibrated. This calibration corresponds to the calibration marked on the respective tubes referred to in the figures heretofore described.

By providing a plurality of glow discharge tubes having small capacity and calibrated accurately at the critical break down or striking potentials required for operation, it is possible to accurately determine the voltage distribution in a high frequency circuit. It is essential that any arrangement provided for measuring the potential be such as not to materially disturb the normal potential distribution in the circuit. Any value of lumped capacitance or inductance will destroy the distribution, and little information of value would result from measurement with a device having either an appreciable amount of inductance or capacity.

I realize that many modifications of the potential indicating device of my invention are possible without departing from the spirit of my invention and it is to be understood that no restrictions as to the embodiments of my invention shall be imposed by the foregoing specification or accompanying drawings but only as defined in the scope of the appended claims.

What I claim as new and desire to secure by Letters Patent of the United States is as follows:

1. A voltage indicating device for signaling systems comprising in combination a plurality of glow discharge tubes, said glow discharge tubes requiring different values of electromotive force to cause ionization, the electrodes of each tube selectively connected to an energizing circuit and each of said tubes individually calibrated as to the critical operating electromotive force required for the respective tube.

2. A voltage indicating device for signaling systems comprising in combination a plurality of glow discharge tubes, said glow discharge tubes requiring different operating voltage potentials, means for selectively connecting the electrodes of each of said tubes with a source of voltage to be measured and said tubes calibrated as to the operating voltage required for the respective tubes.

3. A voltage indicating device comprising in combination a plurality of glow discharge tubes, each of said tubes comprising a transparent envelope having an inert gas content and a pair of electrodes, said tubes requiring different values of operating electromotive force and said values being calibrated on the respective tubes.

4. A voltage indicating device comprising in combination a plurality of tubes capable of giving off luminous radiations when excited by a source of electromotive force, each of said tubes comprising a transparent envelope having an inert gas content and a pair of electrodes, said tubes requiring different values of operating electromotive force, said values of operating electromotive force identified with the respective tubes and means for selectively connecting said tubes to a source of high voltage.

5. A voltage indicating device comprising in combination a plurality of glow discharge tubes having individual electrodes selectively connected to a source of high electromotive force, the operating votages of said tubes being of different values and so calibrated on said tubes.

6. A voltage indicating device comprising in combination a plurality of glow discharge tubes, said tubes requiring different operating voltages, said operating voltage having been predetermined and said tubes so marked, and means for selectively connecting the electrodes of said tubes with a source of high electromotive force whereby the potential of said source may be determined.

7. A voltage indicating device comprising in combination a plurality of glow discharge tubes carried by a rotatable framework, each of said tubes requiring different values of operating voltage, said values having been predetermined with respect to said tubes and means for connecting said tubes with a source of high electromotive force.

8. A voltage indicating device comprising in combination a plurality of flow discharge tubes carried by a rotatable framework, each of said tubes requiring different values of operating voltage, said values having been predetermined with respect to said tubes and means for selectively connecting said tubes with a source of high electromotive force.

9. Apparatus for indicating potential differences in a signaling system comprising a plurality of glow discharge tubes, each of said tubes requiring different voltages to cause ionizations and means for selectively connecting said tubes in said system to indicate the potential difference by the ionization of a particular tube.

10. The combination of a high frequency circuit, a glow discharge tube, and means for rotating said tube whereby said tube may be periodically connected to said circuit.

11. The combination of a high frequency circuit, a plurality of glow discharge tubes and switching means for selectively connecting said tubes thereto.

12. The combination of a high frequency circuit, a plurality of glow discharge tubes and means for rotating said tubes for selectively connecting said tubes to said source.

ARTHUR M. TROGNER.